United States Patent [19]

Lopez

[11] Patent Number: 4,820,413

[45] Date of Patent: Apr. 11, 1989

[54] ANNULAR MODULE FOR FILTERING A PRESSURIZED LIQUID BY REVERSE OSMOSIS

[76] Inventor: Fernand Lopez, 27 rue Emile Barrièreè, 31200 Toulouse, France

[21] Appl. No.: 49,116

[22] Filed: May 13, 1987

[30] Foreign Application Priority Data

May 16, 1986 [FR] France .............................. 86 07171

[51] Int. Cl.$^4$ .................... B01D 13/00; B01D 29/06
[52] U.S. Cl. .......................... 210/321.83; 210/443; 210/492; 210/497.1
[58] Field of Search .............. 210/321.64, 321.83, 210/433.1, 483, 488, 497.1, 435, 438, 440, 443, 444, 489, 492

[56] References Cited

U.S. PATENT DOCUMENTS

| | | | |
|---|---|---|---|
| 3,857,785 | 12/1974 | Martinez | 210/321.74 |
| 4,452,696 | 6/1984 | Lopez | 210/170 |
| 4,476,022 | 10/1984 | Doll | 210/321.83 |
| 4,517,085 | 5/1985 | Driscoll et al. | 210/321.83 X |
| 4,548,714 | 10/1985 | Kirwin, Jr. et al. | 210/321.83 X |

FOREIGN PATENT DOCUMENTS

| | | |
|---|---|---|
| 0673853 | 4/1966 | Belgium . |
| 0045663 | 2/1982 | European Pat. Off. . |
| 2147238 | 3/1973 | Fed. Rep. of Germany . |
| 7904302 | 9/1980 | Netherlands . |

Primary Examiner—Richard V. Fisher
Assistant Examiner—W. Gary Jones
Attorney, Agent, or Firm—Harold H. Dutton, Jr.

[57] ABSTRACT

The invention relates to an annular module for filtration by reverse osmosis of a liquid under pressure. This module comprises a support formed by a tubular spool (1) having a central open volume along the entire spool height and provided with a slit (4) issuing into its peripheral face and extending along a generatrix. This slit communicates with a duct (5) formed in the thickness of the spool and issuing outside thereof at the end of a stud (3). The reverse osmosis filtration membranes (6, 7) are helically wound around the spool; the inner turn of the membranes are impermeably fastened on the peripheral surface of the spool in such a manner that the slit (4) enters between the two membranes of said inner turn.

5 Claims, 5 Drawing Sheets

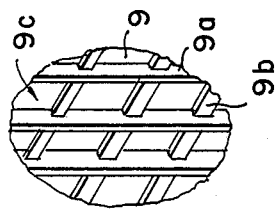
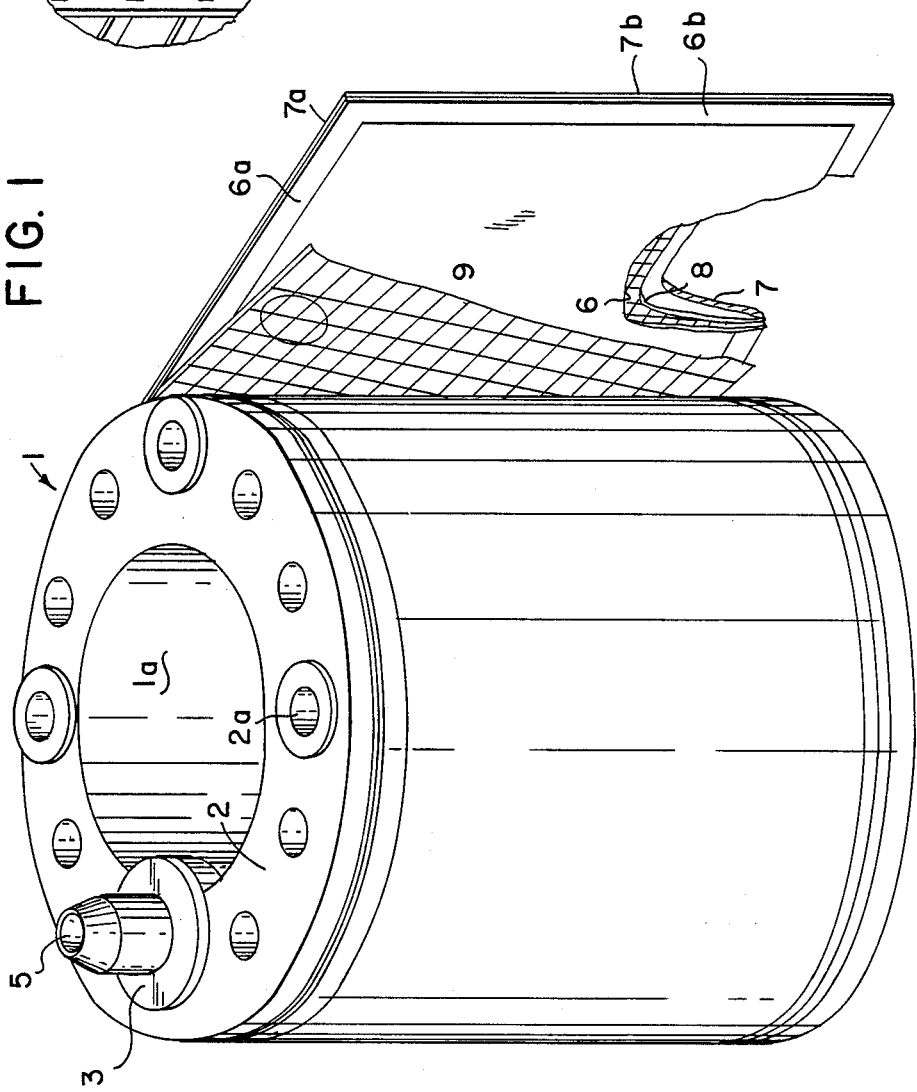

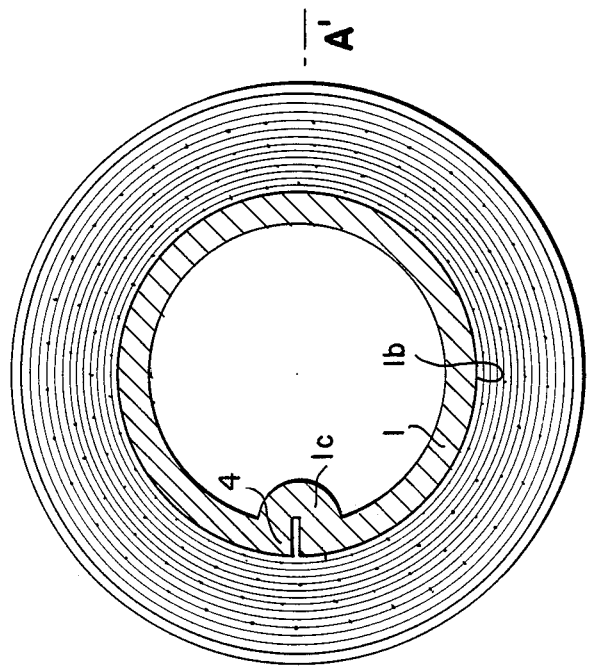
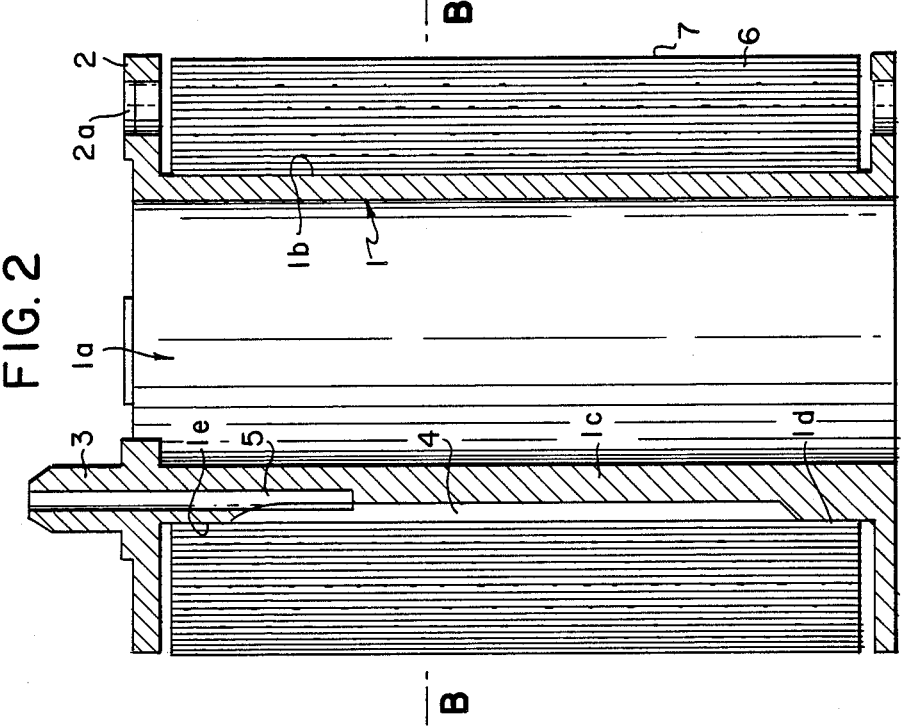

FIG. 10
FIG. 10A
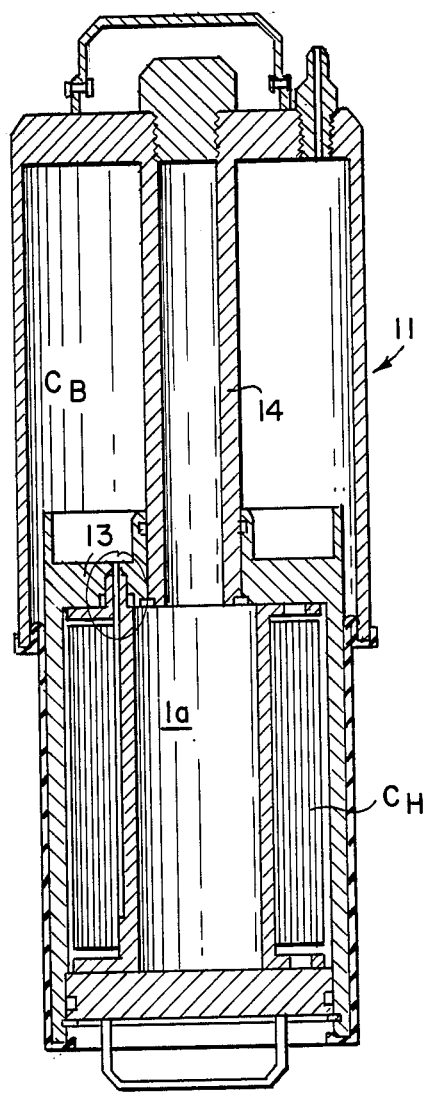
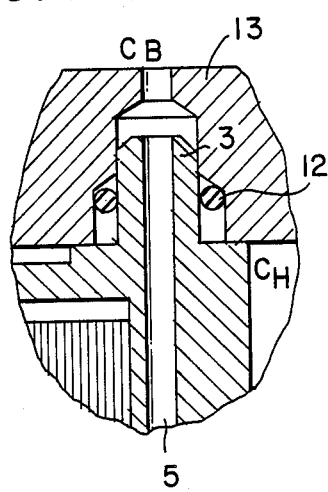

ANNULAR MODULE FOR FILTERING A PRESSURIZED LIQUID BY REVERSE OSMOSIS

BACKGROUND AND OBJECTS OF THE INVENTION

The invention relates to a module for filtration by reverse osmosis intended to be used in equipment filtering a liquid under pressure.

It is known in the field of reverse osmosis to use filter modules comprising foliar semi-permeable membranes wound as helices around a central mandrel. This mandrel is transversed by an axial duct allowing collection at the center of the module of the filtered permeate: the liquid to be filtered is taken in under pressure around the module and the central mandrel duct communicates axially with a low-pressure chamber receiving the filtered liquid. Such a module has the shape of a solid cylinder immersed in the liquid to be filtered. The use of foliar membranes and their helical arrangement make it possible to substantially reduce the bulk of the module for a given membrane surface.

However such a module cannot be used in some applications because it is by its very design a compact cylinder with its central part taken up by the mandrel collecting the filtered liquid. Illustratively, the object of U.S. Pat. No. 4,452,696 is an apparatus for producing fresh water and containing a reverse osmosis module of a generally annular shape of which the central part must be clear in order to pass a movable piston.

In this case as a rule membranes are used in the form of hollow fibers or braids wound around a tubular support. However this type of membrane is much bulkier for a given semi-permeable area.

The object of the present invention is to create a new reverse osmosis, pressurized filter module provided with foliar filter membranes wound in a spiral in order to benefit from a highly advantageous filtration/bulk ratio which providing an entirely clear central part for applications of the type cited above.

Another object is to simplify the module installation in the filtration equipment.

DESCRIPTION OF THE INVENTION

The pressurized filtration module of the invention has an annular shape and comprises:

a support comprising a generally cylindrical and tubular spool having a peripheral cylindrical surface and a hollow central volume open over the entire spool height so that said volume is entirely free and entirely accessible from both ends, at least one slit cut in the peripheral face of the spool along one of the generatrices thereof the slit extending over the height of the spool except for the two end portions, and extending into a fraction of the thickness of the said spool, an axially oriented duct in the same radial plane as each slit and communicating with the slit near one of its ends and issuing above the corresponding rim of the coil, a stud on the same axis as the above duct and projecting beyond the coil rim, the above duct transversing the stud and issuing at its end, two foliar reverse osmosis filter membranes wound in a helix around the cylindrical spool, a perforated spacer layer between the membranes so that each turn comprises two mutually opposite membranes spaced apart by the perforated layer, an impervious fastening of the inner turn on the peripheral surface of the spool so that the above slit issues between the two membranes of the inner turn and that the perforated spacer layer covers said slit, an impervious fastening of the side edges of the two membranes onto each other along the entire helix, an impervious fastening of the end edges of the two membranes near the outer turn.

Accordingly, the module of the invention, immersed in a chamber containing the liquid to be filtered under pressure, leaves the central axial space of this chamber entirely free and accessible. Following filtration through the membranes, the permeate drains through the slit of the spool and then is guided by the above duct towards the low-pressure chamber. It should be noted that the inner turns of the membranes wound around the spool have a radius of curvature much larger than the inner turns of the known modules and thereby incur lesser stresses and their danger of degradation (cracking) is therefore reduced. As will be seen below, the stud through which issues the permeate makes possible to put the module in place very quickly and easily, merely by inserting the stud into a suitable hole and with insertion of an O-ring seal.

DESCRIPTION OF THE DRAWINGS

Other features, purposes and advantages of the invention will become clear from the description below in reference to the drawings showing in illustrative but non-restrictive manner an embodiment of this invention, these drawings being an integral part of the description:

FIG. 1 is a schematic perspective view of a module of the invention (a length of the outer turn, shown with a partial enlargement, illustrates the turn structure), FIG. 2 is an axial sectional view of the module along plane AA', FIG. 3 is a cross-sectional view in a plane BB', FIG. 4 is a detail view of a schematic cross-section of the spool, showing the cementing of the inner turn of the spiral on the spool, while FIG. 10 is an axial sectional view of the module mounted in a reverse osmosis filtration apparatus.

DESCRIPTION OF PREFERRED EMBODIMENTS

Figure 4:
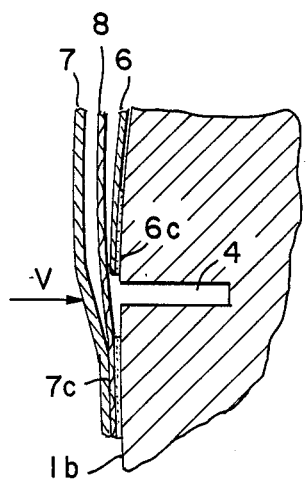

The filtration module illustratively shown in the drawings is a reverse osmosis module suitable for outfitting an apparatus for producing fresh-water from salt water such as disclosed in the U.S. Pat. No. 4,452,696.

This module comprises a support formed by a tubular spool 1 having a generally cylindrical shape that can be manufactured by molding a synthetic material.

The spool is open over its entire height with its open central volume issued on both ends.

The spool 1 is provided with a peripheral surface 1b of cylindrical shape. Its annular rims are extended on each side by a shoulder such as 2. This shoulder comprises apertures 2a for admitting the liquid to be filtered and protects the side edges of the membranes.

Furthermore the spool 1 is provided with an inner reinforcement 1c extending axially along one of its generatrices. This reinforcement is semi-cylindrical and extends on one side by a cylindrical stud 3 projecting beyond the corresponding rim of the spool. This stud is chamfered at its end.

At the reinforcement 1c, the spool 1 is provided with a blind-hole slit 4 open on the peripheral surface 1b. This slit is located along a spool generatrix and extends along the height of this spool except for two end zones 1d and 1e; it is a fraction of the spool thickness deep.

The spool moreover is hollowed on the stud 3 side by an axial duct 5 located in the same axial plane as the slit 4. At one end this duct 5 communicates with the slit 4 in the vicinity of the corresponding end of this slit, while at the other end, it extends into the stud 3 and issues above the corresponding rim of the spool at the end of the stud.

The inner spool reinforcement 1c extending axially along the slit 4 and the duct 5 achieves at that location suitable strength without thereby increasing spool thickness.

The spool 1 holds two reverse osmosis membranes wound in a spiral around its peripheral surface 1b.

These membranes are "sheet-membranes" or "planar membranes". As shown in FIG. 1, these two mutually opposite membranes 6 and 7 are spaced apart by a perforated spacer layer 8 in the nature of a grid or permeable layer to prevent the membranes from being forced against each other by the pressure.

Moreover a netting 9 separating the turns is wound between them to maintain good diffusion of the pressurized water between the turns. This netting comprises strands 9a extending along the height of the membranes and thicker than the strands 9b extending around the circumference, thereby defining drains 9c parallel to the axis of the spool 1 enhancing water flow between turns (and in particular evacuation of the saturated water following filtration).

The two membranes 6 and 7 are impermeably cemented to each other along their lateral edges such as 6a and 7a and also along their end edges 6b, 7b. The outer can be fastened to the adjacent one in any desired manner, cementing, adhesive tape, etc., in order to keep the helix in the closed position.

The membrane width is slightly less that the width of the peripheral surface 1b of the spool: the lateral and cemented eges of these membranes are wound at the spool portions 1d and 1e whereas the active intermediate parts of these membranes are wound at the slit 4.

Figure 5:
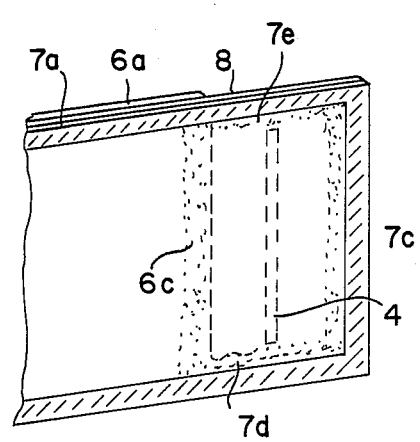
FIG. 5 shows the end of this turn as seen along the arrow V.

As schematically shown by FIGS. 4 and 5, the inner turn is impermeably cemented on the peripheral spool surface 1b whereby the slit 4 issues between the two membranes of that turn denoted as "end membrane (6)" being the one adjacent to the spool and "other membranes (7)" being the second membrane.

In the examples shown in FIGS. 4 and 5, the end membrane 6 of the inner turn is impermeably cemented to the peripheral surface 1b on the downstream side of the slit 4 (in relation to the winding direction of the turns) whereas the other membrane 7 has a length extending that of the end membrane and also is impermeably cemented at the upstream side of the slit 4 on one hand axially by its rim 7c along the slit and on the other hand laterally at 7d and 7e to both sides of this slit.

The perforated spacer layer 8 between the membranes extends in such a manner into the inner turn that it covers the slit 4 to prevent it from clogging due to the pressure applied on the inner turn.

Figure 6:
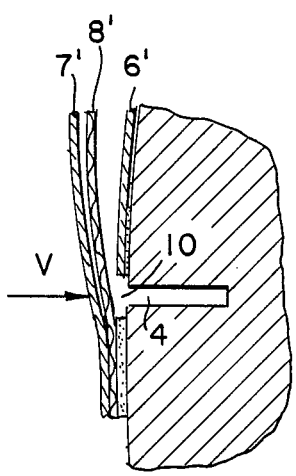
FIG. 6, 7, 8 and 9 are similar views of variations in cementing.
Figure 7:
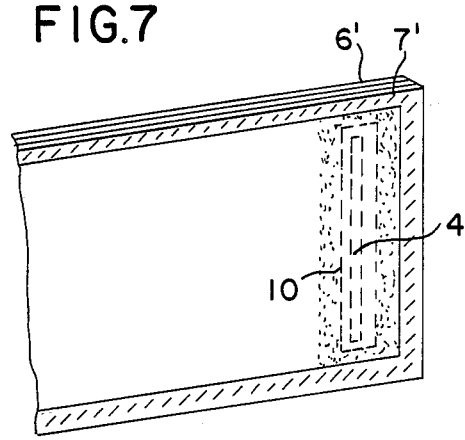

FIGS. 6 and 7 illustrate a variation in fastening the inner turn on the spool.

In this variation, the two membranes 6' and 7' of the inner turn are of the same length and are impermeably cemented to each other along their axial and lateral edges in the same manner as applies to the outer turn.

But in this instance the end membrane 6' of the inner turn comprises a cut-out aperture 10 matching the slit 4. This end membrane 6' is impermeably cemented on the peripheral spool surface around the slit 4, the aperture matching this slit 4.

The spacer layer 8' extends as far as the edges of the membranes so that it will cover as before the slit 4.

For some membranes, preferably their cementing is carried out on their low-pressure active side (the membranes sides located inward when the membranes face each other).

Figure 8:
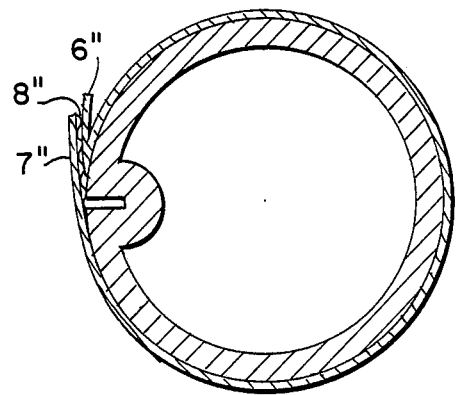
Figure 9:
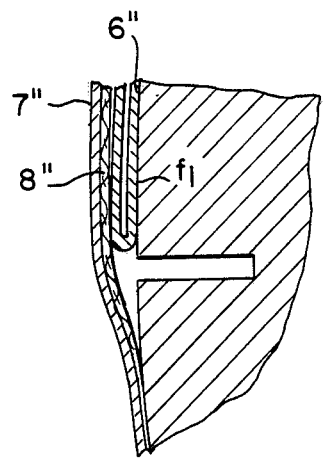

In that case, the peripheral spool surface can be cemented in the manner shown in FIGS. 8 and 9. The two membranes comprise of two lengths 6" and 7" of a one piece membrane placed around the spool as schematically indicated by FIG. 8 and which is cemented by its low-pressure active side $f_1$ all around the spool. The length 6" is folded back on itself near the slit 4 and the length 7" covers it, the spacer layer 8" being between the two. Obviously the two membrane lengths 6" and 7" are impermeably cemented to each other along their edges in the manner already described.

FIG. 10 shows a module of the invention inserted into the high-pressure chamber $C_H$ of a salt-water desalinator 11 illustratively described in the French patent application No. 2,588,546. The stud 3 is provided with an O-ring seal 12 and enters a suitably shaped hole in the wall 13 separating the high-pressure chamber from the low-pressure chamber $C_B$ where the filtered water is collected. The seal 12 is forced by the pressure against a conical support. The open central volume 1a of the module is filled with pressurized water and offers a housing for a piston 14 which progressively enters this volume as filtration proceeds.

I claim:

1. An annular reverse osmosis filtration module for a liquid under pressure comprising a generally cylindrical tubular support having an external peripheral surface and a hollow central volume open at the ends thereof and sealed from and out of fluid communication with said external peripheral surface, at least one slit formed in said external peripheral surface along a generatrix of said spool and extending along the length of said spool and having a depth less than the thickness of said spool, said spool further having radially extending flanges at each end thereof, an axial duct extending through a stud on one of said flanges and being in fluid communication with said slit and out of fluid communication with said central volume, a pair of reverse osmosis filtration membranes spirally wound around said external peripheral surface and having a perforate spacer layer between said membranes so that each turn comprises two mutually opposite membranes separated by said spacer layer, a perforate fastening of the inner turn on said external peripheral surface positioned such that said perforated space layer covers said slit and that the space between said membranes empties into said slit, means for imperviously fastening the lateral edges of said membranes together along substantially their entire length and means for imperviously fastening the outermost ends of said membranes together.

2. An annular filtration module as in claim 1 wherein:

one end of the inner turn of one membrane is impermeably cemented on the spool peripheral surface on the downstream side of the slit with respect to the winding direction of the turn, and one end of the other membrane is of a length exceeding that of said one membrane and is impermeably cemented along the upstream side of the slit and on both ends of said slit.

3. An annular filtration module as in claim 1, wherein:

one end of the inner turn of said membrane is impermeably cemented on the spool peripheral surface over said slit, and including an aperture cut out around said slit, the other membrane being impermeably cemented to said one membrane along its axial and lateral edges.

4. An annular filtration module as in claim 1, comprising a netting separating the turns and wound between said turns and defining water draining passages extending along the height of the spool.

5. An annular filtration module as in claim 1 and wherein said membranes are formed from a single sheet having a longitudinal center section wrapped once around said external peripheral surface and cemented thereto at least adjacent said slit and thereafter having the ends of said single sheet wound around said spool with said spacer layer therebetween.

* * * * *